June 28, 1932. H. S. STONE 1,864,956
FASTENING MEANS FOR BAGS AND THE LIKE
Filed May 15, 1931
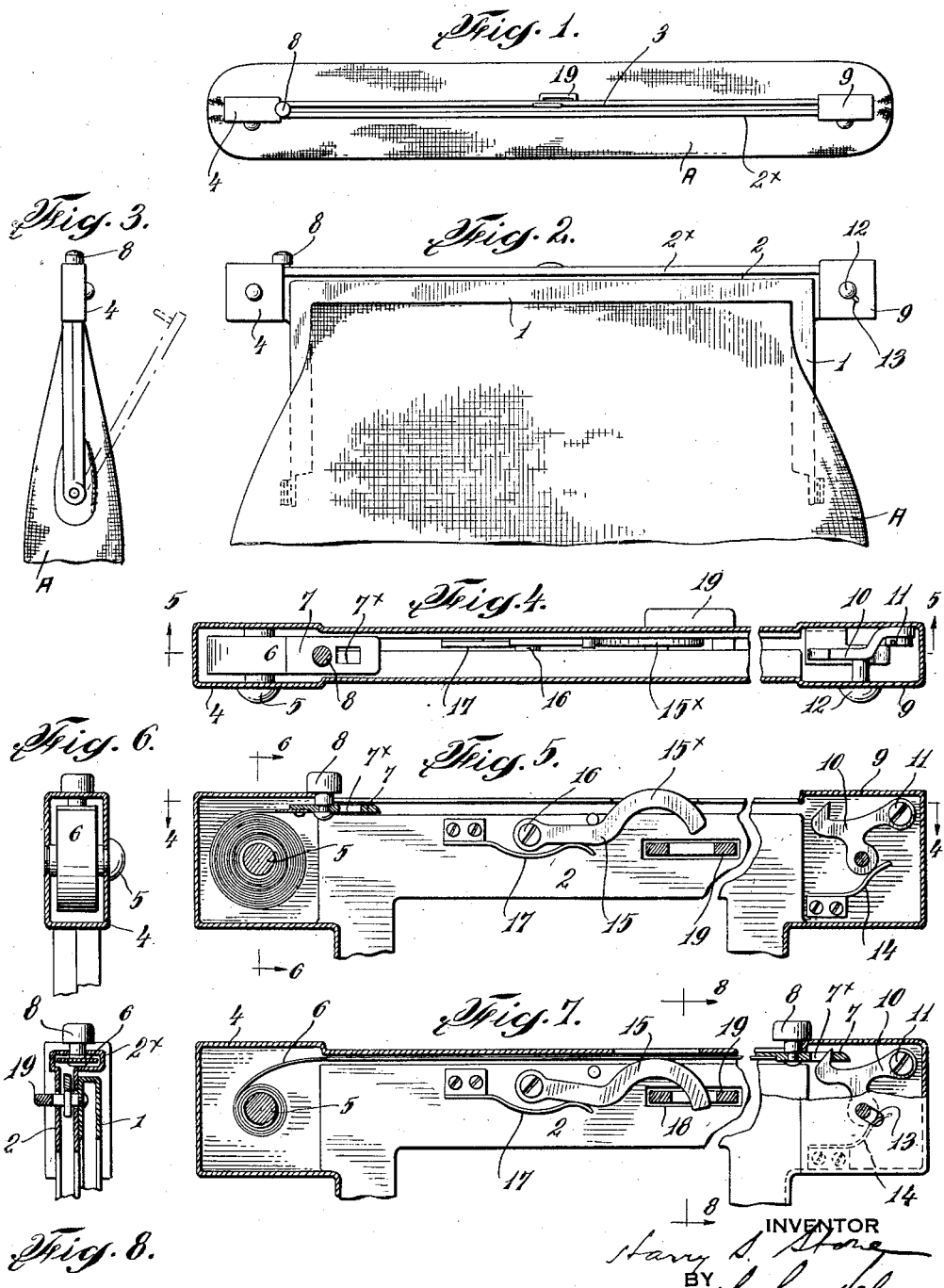

Patented June 28, 1932

1,864,956

UNITED STATES PATENT OFFICE

HARRY S. STONE, OF NEW YORK, N. Y.

FASTENING MEANS FOR BAGS AND THE LIKE

Application filed May 15, 1931. Serial No. 537,542.

The object of the present invention is to provide means for fastening two abutting members as in the case of a bag frame comprising two hinged members.

The invention will be described with reference to the accompanying drawing in which Fig. 1 is a plan view of an embodiment of the invention from the top thereof.

Figure 2 is a fragmentary side elevation of the embodiment.

Fig. 3 is a fragmentary end elevation.

Fig. 4 is a longitudinal horizontal section on the line 4—4, Fig. 5.

Fig. 5 is a vertical section on the line 5—5, Fig. 4.

Fig. 6 is a vertical section on the line 6—6, Fig. 5.

Fig. 7 is a view similar to Fig. 5 showing the fastening device in active position.

Fig. 8 is a vertical section on the line 8—8, Fig. 7.

Referring to the drawing, I have therein shown a handbag comprising a fabric bag member A and a frame comprising two hinged members one member being indicated at 1 and the second at 2.

Referring to Fig. 8, it will be seen that the frame member 2 is formed with a lateral extension 2x overhanging the top of frame member 1.

By reference to Fig. 1, it will be seen that the extension 2x is formed with a longitudinal slot 3 communicating with the hollow interior of the section. Lateral extension 2x is in communication with a box-like holder 4 at the left hand end of the frame and carried thereby. Extending within and transversely of the holder is a post 5 to which is secured one end of a flat spring 6 which normally is loosely encircled about the post. This spring is secured to a short plate 7 having a recess at 7x to receive a catch, the plate having an operating finger piece 8 the shank of which projects through slot 3 of overhanging extension 2x.

At the right hand end of the frame overhanging extension 2x is in communication with a box-like member 9 carried by frame member 2. Within the box-like member 9 is a locking hook 10 pivoted at 11 and connected to a thumb stud 12 projecting through the front wall of said box-like member 9. The shank of thumb stud 12 may be given a limited movement within an elongated slot 13 in the box-like member. The locking hook 11 is normally held in operative position by a leaf spring 14.

Carried by frame member 2 is a cam hook 15 pivoted at 16 and normally held upwardly by a leaf spring 17. The cam section 15x of the hook is thus brought upwardly in line with the plate 7 so that when thumb piece 8 is grasped by the operator and plate 7 is moved to the right, it will engage cam 15x and move the hook downwardly.

Frame member 2 is formed with a lateral aperture 18 to receive an apertured lug 19 carried by frame member 1 the aperture of the latter being adapted to receive the end of hook 15 when finger piece 8 is moved from the position shown in Fig. 5 to the position shown in Fig. 7. In such movement the end of plate 7 will strike the operative end of hook 10 which end is bevelled and will cause the hook to move down and then to move upwardly by spring 17 to enter aperture 7x of the plate and thereby latch the spring in operative position to hold the hook into engagement with apertured lug 19.

It will be understood that various modifications may be made in the form and arrangement of the elements comprised in the embodiment illustrated without departing from the spirit of the invention. What I claim and desire to secure by Letters Patent is as follows:—

1. A fastening means for bags and the like comprising an apertured catch member and a hook member adapted to engage the catch member in combination with a flexible metallic strip adapted to be longitudinally moved and to hold the hook in engagement with the catch member and means for latching the flexible member when the latter is moved to operative position.

2. In fastening means for bags and the like and in combination with mutually hinged frame members, one of said frame members having a raceway, of a flexible metallic member adapted for movement in said raceway, a locking hook having a cam surface projected into said raceway, a latching device carried by the second frame member and adapted to receive said hook.

3. A device constructed in accordance with claim 2 in which the flexible endwise movable member comprises a spring secured at one end and tending to move into coiled position when carried endwise into operative position with respect to the hook.

4. A device constructed in accordance with claim 2 in which the endwise movable flexible member comprises a flat spring, a finger piece connected to the spring by which the latter may be manually moved endwise, and a manually retractable latching device adapted to automatically engage the spring when it is moved into operative position by said thumb piece.

In testimony whereof, I have signed my name to this specification.

HARRY S. STONE.